UNITED STATES PATENT OFFICE.

JESSE A. DUBBS, OF ALLEGHENY, ASSIGNOR OF ONE-HALF TO JAMES H. WHITE, OF PITTSBURG, PENNSYLVANIA.

MANUFACTURE OF ASPHALTUM.

SPECIFICATION forming part of Letters Patent No. 480,234, dated August 2, 1892.

Application filed July 10, 1891. Serial No. 399,020. (No specimens.)

*To all whom it may concern:*

Be it known that I, JESSE A. DUBBS, a citizen of the United States, residing at Allegheny, in the county of Allegheny and State of Pennsylvania, have invented or discovered certain new and useful Improvements in the Manufacture of Asphaltum, of which improvements the following is a specification.

The invention described herein relates to certain improvements in the manufacture of asphaltum from crude petroleum or residuum thereof, and under the term "residuum" I include all heavy products remaining in the still after distillation by combining sulphur therewith, the sulphur under the influence of heat forming a chemical combination with the residuum, all as more fully hereinafter described and claimed.

Most crude petroleums contain as a constituent element thereof some material or substance which will prevent a chemical combination between the petroleum or residuum containing such element and the sulphur. This deleterious substance I now believe to be one of the paraffine series, and in order to remove this element or substance in the practice of my invention I subject the crude petroleum containing paraffine to the action of steam or like fluid in a manner similar to that practiced in steam-distillation of crude petroleum until practically free from paraffine-wax. The still is then subjected to external heat or the steam-reduced material while hot is transferred to another externally-heated vessel, and sulphur is then added in about the proportion of one pound of sulphur to each gallon of the reduced material, though the amount of sulphur may be varied in accordance with the specific gravity of reduced petroleum and the character of asphaltum required. The temperature of the mixture is then raised to a little below the point of distillation and maintained at that temperature until the evolution of sulphureted hydrogen ceases, thereby indicating the proper chemical combination of the petroleum and the sulphur.

It will be readily understood that in the manufacture of asphaltum petroleum residuum which has previously been treated with steam for the removal of paraffine-wax or crude petroleum practically free from such deleterious material may be employed. In such case the crude petroleum or residuum practically free from paraffine-wax is charged into a suitable externally-heated still and subjected to sufficient heat to remove all moisture therefrom, and then sulphur in the proportion of one pound to a gallon of the crude petroleum or residuum is added. The temperature of the mixture is then raised to a point a little below that of distillation, as hereinbefore described, and maintained at such temperature until the desired chemical combination has been effected, as will be indicated by a cessation of the evolution of sulphureted hydrogen. It is preferred to charge the sulphur in an anhydrous condition; but if the sulphur when charged should contain moisture the mixture of oil or residuum and sulphur should not be heated above 250° Fahrenheit until all moisture has been driven off, or, in other words, until both the oil or residuum and the sulphur are in an anhydrous condition.

I claim herein as my invention—

1. The method herein described of manufacturing asphaltum, which consists in heating the crude petroleum or residuum free from paraffine-wax to sufficient heat to remove the moisture therefrom, adding sulphur to the heated material in about the proportions stated, and then raising the temperature of the mixture to a point a little below that of distillation of the oil or residuum and maintaining it at such temperature until the desired chemical combination has been effected, substantially as set forth.

2. The method herein described of manufacturing asphaltum, which consists in mixing a crude petroleum or residuum free from paraffine-wax and sulphur in about the proportions stated, heating the mixture to a point a little below the point of distillation, and maintaining it at such temperature until the desired combination has been effected, substantially as set forth.

3. The method herein described of manufacturing asphaltum, which consists in subjecting crude petroleum or residuum thereof to the action of steam, thereby removing the paraffine-wax therefrom, adding sulphur to the material thus purified in about the proportions stated, subjecting the mixture to a temperature a little below the temperature of distillation, and maintaining the mixture at such temperature until the desired combination has been effected, substantially as set forth.

In testimony whereof I have hereunto set my hand.

JESSE A. DUBBS.

Witnesses:
DARWIN S. WOLCOTT,
R. H. WHITTLESEY.